United States Patent
Bennah et al.

(10) Patent No.: US 9,116,860 B2
(45) Date of Patent: *Aug. 25, 2015

(54) CASCADING FAILOVER OF BLADE SERVERS IN A DATA CENTER

(71) Applicant: INTERNATIONAL BUSINESS MACHINES CORPORATION, Armonk, NY (US)

(72) Inventors: Albert D. Bennah, Cary, NC (US); Adrian X. Rodriguez, Durham, NC (US); Ying Zuo, San Jose, CA (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 237 days.

This patent is subject to a terminal disclaimer.

(21) Appl. No.: 13/714,907

(22) Filed: Dec. 14, 2012

(65) Prior Publication Data

US 2014/0173329 A1    Jun. 19, 2014

(51) Int. Cl.
*G06F 11/00* (2006.01)
*G06F 11/20* (2006.01)

(52) U.S. Cl.
CPC .......... *G06F 11/2028* (2013.01); *G06F 11/203* (2013.01); *G06F 11/2025* (2013.01); *G06F 11/2035* (2013.01); *G06F 11/2046* (2013.01); *G06F 2201/815* (2013.01)

(58) Field of Classification Search
CPC .................................................. G06F 11/2028
USPC ...................................................... 714/4.11
See application file for complete search history.

(56) References Cited

U.S. PATENT DOCUMENTS

| | | |
|---|---|---|
| 6,963,828 B1 | 11/2005 | McDonald et al. |
| 6,990,606 B2 | 1/2006 | Schroiff et al. |
| 7,050,961 B1 | 5/2006 | Lee et al. |
| 7,234,073 B1 | 6/2007 | Roytman et al. |
| 7,281,154 B2 | 10/2007 | Mashayekhi et al. |
| 7,451,347 B2 * | 11/2008 | Subbaraman et al. .......... 714/10 |
| 7,523,345 B2 | 4/2009 | Schroiff et al. |
| 7,747,717 B2 | 6/2010 | Colrain |
| 7,757,116 B2 | 7/2010 | Brown et al. |
| 7,873,702 B2 | 1/2011 | Shen et al. |

(Continued)

OTHER PUBLICATIONS

IBM, "Failover and Failback Operations", IBM.com (online), accessed Aug. 30, 2012, 1pp., URL: http://publib.boulder.ibm.com/infocenter/dsichelp/ds8000ic/index.jsp?topic=%2Fcom.ibm.storage.ssic.help.doc%2Ff2c_pprcfailbackov_1v262p.html.

(Continued)

*Primary Examiner* — Amine Riad
(74) *Attorney, Agent, or Firm* — Edward J. Lenart; Katherine S. Brown; Kennedy Lenart Spraggins LLP

(57) ABSTRACT

Cascading failover of blade servers in a data center implemented by transferring by a system management server a data processing workload from a failing blade server to an initial replacement blade server, with the data processing workload characterized by data processing resource requirements and the initial replacement blade server having data processing resources that do not match the data processing resource requirements; and transferring by the system management server the data processing workload from the initial replacement blade server to a subsequent replacement blade server, where the subsequent replacement blade server has data processing resources that better match the data processing resource requirements than do the data processing resources of the initial replacement blade server.

13 Claims, 3 Drawing Sheets

(56) References Cited

U.S. PATENT DOCUMENTS

| | | | |
|---|---|---|---|
| 7,900,206 B1 | 3/2011 | Joshi et al. | |
| 7,937,617 B1 | 5/2011 | Nagineni et al. | |
| 7,953,843 B2 | 5/2011 | Cherkasova | |
| 7,971,094 B1* | 6/2011 | Benn et al. | 714/13 |
| 8,055,933 B2 | 11/2011 | Jaehde et al. | |
| 8,060,599 B2 | 11/2011 | Cherkasova et al. | |
| 8,527,996 B2 | 9/2013 | Murthy et al. | |
| 8,566,549 B1* | 10/2013 | Burke et al. | 711/168 |
| 8,738,961 B2* | 5/2014 | Jain et al. | 714/4.11 |
| 8,793,365 B2 | 7/2014 | Arsovski et al. | |
| 2002/0073354 A1* | 6/2002 | Schroiff et al. | 714/4 |
| 2003/0187967 A1 | 10/2003 | Walsh et al. | |
| 2003/0204539 A1* | 10/2003 | Bergsten | 707/204 |
| 2005/0021573 A1* | 1/2005 | McDermott et al. | 707/204 |
| 2005/0268156 A1 | 12/2005 | Mashayekhi et al. | |
| 2005/0278453 A1 | 12/2005 | Cherkasova | |
| 2006/0015773 A1 | 1/2006 | Singh et al. | |
| 2006/0080568 A1 | 4/2006 | Subbaraman et al. | |
| 2006/0085428 A1 | 4/2006 | Bozeman et al. | |
| 2007/0036178 A1* | 2/2007 | Hares et al. | 370/490 |
| 2008/0256167 A1* | 10/2008 | Branson et al. | 709/201 |
| 2008/0256384 A1* | 10/2008 | Branson et al. | 714/4 |
| 2008/0285435 A1 | 11/2008 | Abdulla et al. | |
| 2009/0012963 A1* | 1/2009 | Johnson et al. | 707/10 |
| 2010/0312979 A1 | 12/2010 | Kavuri et al. | |
| 2011/0214009 A1 | 9/2011 | Aggarwal et al. | |
| 2012/0047394 A1* | 2/2012 | Jain et al. | 714/4.11 |
| 2012/0136971 A1 | 5/2012 | Cherkasova et al. | |
| 2013/0124267 A1 | 5/2013 | O'Sullivan et al. | |
| 2013/0227244 A1 | 8/2013 | Jung et al. | |
| 2014/0173332 A1 | 6/2014 | Bennah et al. | |
| 2014/0173336 A1 | 6/2014 | Bennah et al. | |
| 2014/0376362 A1* | 12/2014 | Selvaraj et al. | 370/221 |

OTHER PUBLICATIONS

Kirvan, P., "Dealing with failback problems", TechTarget.com (online), Jul. 2012, [accessed Sep. 12, 2012], 16pp., URL: http://searchdisasterrecovery.techtarget.com/tip/Dealing-with-failback-problems.

Office Action, U.S. Appl. No. 13/717,031, Aug. 15, 2014, pp. 1-15.

* cited by examiner

CASCADING FAILOVER OF BLADE SERVERS IN A DATA CENTER

BACKGROUND OF THE INVENTION

1. Field of the Invention

The field of the invention is data processing, or, more specifically, methods, systems, and products for cascading failover of blade servers in a data center.

2. Description of Related Art

The development of the EDVAC computer system of 1948 is often cited as the beginning of the modern computer era. Since that time, computer devices have evolved into extremely complicated systems, much more sophisticated and complex than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Complex, sophisticated computer systems today are often organized in large data centers. Blade computers in such data centers are increasingly used to run critical applications that require a high level of redundancy and fault tolerance. Modern data centers employ various failover schemes whereby the failure of one blade server can trigger an automatic replacement of that server from a pre-established backup pool of standby servers. In this way, a catastrophic loss or serious degradation of performance in one server in a data center with thousands of blade servers will trigger the automatic introduction of another server to continue the original server's workload. In prior art systems, however, the technology is primarily focused on the availability of standby resources for such failover. As such, there is a risk that over time, these backup pools of systems may not contain any system that is optimized for the workload currently running on a primary system.

SUMMARY OF THE INVENTION

Methods, apparatus, and products implement cascading failover of blade servers in a data center by transferring by a system management server a data processing workload from a failing blade server to an initial replacement blade server, with the data processing workload characterized by data processing resource requirements and the initial replacement blade server having data processing resources that do not match the data processing resource requirements; and transferring by the system management server the data processing workload from the initial replacement blade server to a subsequent replacement blade server, where the subsequent replacement blade server has data processing resources that better match the data processing resource requirements than do the data processing resources of the initial replacement blade server.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
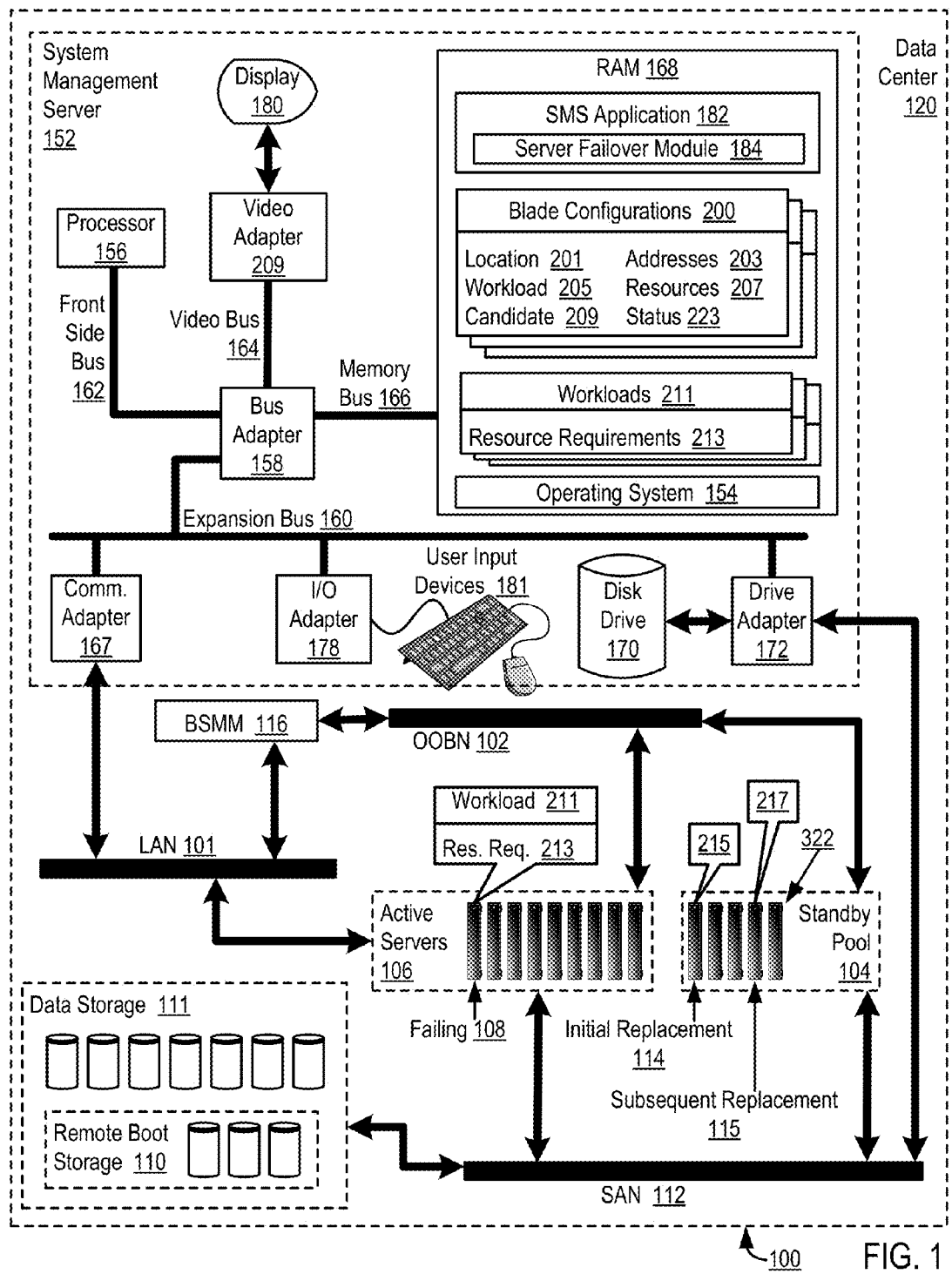
FIG. 1 sets forth a functional block diagram of an example system that implements cascading failover of blade servers in a data center (120).

Example methods, apparatus, and products for cascading failover of blade servers in a data center are described with reference to the accompanying drawings, beginning with FIG. 1. FIG. 1 sets forth a functional block diagram of an example system (100) that implements cascading failover of blade servers (106) in a data center (120). The data center (120) is a facility used to house mission critical computer systems and associated components. Such a data center includes environmental controls (air conditioning, fire suppression, and the like), redundant/backup power supplies, redundant data communications connections, and high security, including in some embodiments biometric access controls to compartmentalized security zones within the facility. A data center houses a large amount of electronic equipment, computers, and communications equipment. Data centers are maintained by organizations for the purpose of handling the data necessary for their operations. A bank, for example, may have a data center, where all its customers' account information is maintained and transactions involving these accounts are carried out. Practically every company that is mid-sized or larger has some kind of data center, with larger companies often having dozens of data centers.

A server, as the term is used in this specification, refers generally to a multi-user computer that provides a service (e.g. database access, file transfer, remote access) or resources (e.g. file space) over a network connection. The term 'server,' as context requires, refers inclusively to the server's computer hardware as well as any server application software or operating system software running on the server. A server application is an application program that accepts connections in order to service requests from users by sending back responses. A server application can run on the same computer as the client application using it, or a server application can accept connections through a computer network. Examples of server applications include file server, database server, backup server, print server, mail server, web server, FTP servers, application servers, VPN servers, DHCP servers, DNS servers, WINS servers, logon servers, security servers, domain controllers, backup domain controllers, proxy servers, firewalls, and so on.

Blade servers are self-contained servers, designed for high density. A blade enclosure houses multiple blade servers and provides services such as power, cooling, networking, various interconnects and management—though different blade providers have differing principles regarding what should and should not be included in the blade itself—and sometimes in the enclosure altogether. Together, a set of blade servers are installed in a blade enclosure or 'blade center' for a blade system. As a practical matter, all computers, including blade servers, are implemented with electrical components requiring power that produces heat. Components such as processors, memory, hard drives, power supplies, storage and network connections, keyboards, video components, a mouse, and so on, merely support the basic computing function, yet they all add bulk, heat, complexity, and moving parts that are more prone to failure than solid-state components. In the blade paradigm, most of these functions are removed from the blade computer, being either provided by the blade enclosure (DC power), virtualized (iSCSI storage, remote console over IP), or discarded entirely (serial ports). The blade itself becomes simpler, smaller, and amenable to dense installation with many blade servers in a single blade enclosure and many, many blade servers in a data center.

The example system of FIG. 1 includes a number of servers, active blade servers (106), a pool (104) of available standby blade servers (322), and a system management server (152). An active blade server (106) is a blade server presently in use to provide responses to user requests for data processing services from the data center (120). A standby blade server (322) is a blade server that is not presently in use to provide responses to user requests for data processing services from the data center (120) but is available to be brought into active service upon failure of an active blade computer. The pool (104) is a grouping or listing of standby blade servers (322). In addition to active blade servers and standby blade servers, the data center can include other blade servers, including in particular blade servers that have failed, that is, inactive blade servers (not shown) that have not yet been returned to availability.

The system of FIG. 1 includes an example system management server (152) adapted for use in cascading failover of blade servers in a data center according to embodiments of the present invention. The example system management server (152) illustrated in FIG. 1 is a server of the data center (120) that automates many of the processes that are required to proactively manage servers in the data center, including capacity planning, asset tracking, preventive maintenance, diagnostic monitoring, troubleshooting, firmware updates, blade server failover, and so on. The system management server (152) of FIG. 1 includes at least one computer processor (156) or 'CPU' as well as random access memory (168) ('RAM') which is connected through a high speed memory bus (166) and bus adapter (158) to processor (156) and to other components of the system management server (152).

Stored in RAM (168) is a system management server application program (182), a set of computer program instructions that operate the system management server so as to automatically under program control carry out processes required to manage servers in the data center, including capacity planning, asset tracking, preventive maintenance, diagnostic monitoring, troubleshooting, firmware updates, blade server failover, and so on. An example of a system management server application program (126) that can be adapted for use in cascading failover of blade servers in a data center is IBM's 'IBM Director.'

Also stored in RAM (168) in the example system management server of FIG. 1 is a server failover module (130), a module of computer program instructions for automatic administration of blade server failover. The transfer of operation from a failing active blade server (108) to an available standby blade server (114) so as to ensure uninterrupted data flow, operability, and data processing services for users of the data center is referred to in this specification as 'failover.' Failover is the automated substitution of a functionally equivalent standby blade server for a failing active blade server, although, as described in more detail below, the functional equivalence may be imperfect. 'Cascading failover' is the use of more than one substitution of a standby blade server in an effort to effect a better functional equivalence, a better match between assigned data processing resources and the requirements of a particular data processing workload. Failures that lead to failover, cascading or otherwise, can include a loss of power to an active blade server, a memory fault in an active blade server, a processor defect in an active blade server, loss of network connectivity for an active blade server, and so on. The data center (120) in this example provides automated cascading failover from a failing active blade server to a standby blade server through the server failover module (130) of the system management server (152). An example of a server failover module that can be improved for failover of blade servers in a data center according to embodiments of the present invention is IBM's 'Boot From SAN Blade Failover Extension for IBM Director.'

The system management server also maintains in memory blade configuration information (200) for the blade servers in the data center. Such blade configuration information includes:

physical locations (201), such as, for example, physical rack, chassis, or slot numbers indicating the physical location of blades in the data center,
workload identifiers (205) for workloads assigned for execution on active blade servers,
a boolean indication (209) whether a blade server is a candidate for cascading workload failover to a subsequent replacement blade server,
pertinent configuration addresses (203), including blade server network addresses, remote boot storage addresses, and the like,
actual data processing resources (207) provided by each blade server, RAM, computer processors, disk storage, communications adapters, input/output adapters, video adapters, and so on, and
a status field (223) indicating, for example, whether a particular blade server is active, on standby, or offline for repair.

Also stored in RAM (168) is an operating system (154). Operating systems useful for cascading failover of blade servers in a data center according to embodiments of the present invention include UNIX™, Linux™, Microsoft XP™, AIX™, IBM's i5/OS™, and others as will occur to those of skill in the art. The operating system (154), the system management server application (182), the server failover module (184), and the blade configuration information (200) in the example of FIG. 1 are shown in RAM (168), but many components of such software typically are stored in non-volatile memory also, such as, for example, on a disk drive (170).

The system management server (152) of FIG. 1 includes disk drive adapter (172) coupled through expansion bus (160) and bus adapter (158) to processor (156) and other components of the system management server (152). Disk drive adapter (172) connects non-volatile data storage to the system management server (152) in the form of disk drive (170). Disk drive adapters useful in system management servers for cascading failover of blade servers in a data center according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), a RAM drive, and so on, as will occur to those of skill in the art.

The example system management server (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181)

such as keyboards and mice. The example system management server (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example system management server (152) of FIG. 1 includes a communications adapter (167) for data communications with other computers and for data communications with data communications networks including local area network ('IAN') (101). Such data communications may be carried out serially through RS-232 connections, through external buses such as a Universal Serial Bus ('USW'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for cascading failover of blade servers in a data center according to embodiments of the present invention include modems for wired dial-up communications, Ethernet (IEEE 802.3) adapters for wired data communications network communications, and 802.11 adapters for wireless data communications network communications.

The example system of FIG. 1 includes a blade server management module (116), an aggregation or module of computer hardware and software that is installed in a blade enclosure or blade center to provide support services for blade servers in the blade enclosure. Support services provided by the blade server management module (116) include monitoring health of blade servers and reporting health statistics to the system management server (152), power management and power control, save and restore configurations, discovery of available blade servers, event log management, memory management, and so on. An example of a blade server management module that can be used in systems that effect cascading failover of blade servers is IBM's Advanced Management Module ('AMM'). The blade server management module (116) in this example communicates with the system management server (152) through a local area network ('LAN') (101), and the blade server management module (116) communicates with the blade servers (106, 104) through an out-of-band network (102). The LAN (101) may be implemented as an Ethernet, an IP (Internet Protocol) network, or the like, and the out-of-band network (102) may be implemented as an Inter-Integrated Circuit ('I²C') bus, a System Management Bus ('SMBus'), an Intelligent Platform Management Bus ('IPMB'), or the like.

Each blade server (104, 106) in this example is mapped to data storage (111), including remote computer boot storage (110), through a storage area network ('SAN') (112). The boot storage (110) is 'remote' in the sense that all the system-level software, such as a kernel and other operating system software, that is needed to operate each server is stored, not on a server (106) as such, but remotely from the server across a storage area network ('SAN') (112) on storage exposed to the blade servers through the SAN. The only boot-related software permanently stored on the blade servers (104, 106) themselves is a thin piece of system-level firmware required to initiate a boot from remote storage.

The SAN (112) is a network architecture that attaches remote computer storage devices (111) such as magnetic disks, optical disks, and disk arrays, for example, to blade servers so that, to the blade server's operating system, the remote storage devices appear as locally attached disk drives. The remote boot storage (110) that can be mapped to the blade servers in this example is exposed by the SAN (112) to each server (104, 106) as a separate virtual drive. Such virtual drives are often referred to or referenced by a so-called logical unit number or 'LUN.' A LUN is an address for an individual disk drive and by extension, the disk device itself A LUN, or the remote storage identified by a LUN, is normally not an entire disk drive but rather a virtual partition (or volume) of a RAID set—in such an example embodiment a virtual disk drive that organized a portion of RAID (Redundant Array of Inexpensive Drives) storage and presents it to an operating system on a server as an actual disk drive. Many if not most SANs use the SCSI protocol for communication between servers and disk drive devices, though they do not use its low-level physical interface, instead typically using a mapping layer. The mapping layer may be implemented, for example, with Fibre Channel (Fibre Channel Protocol or 'FCP' is Fibre Channel's SCSI interface), iSCSI (mapping SCSI over TCP/IP), HyperSCSI (mapping SCSI over Ethernet), Advanced Technology Attachment ('ATA') over Ethernet, InfiniBand (which supports mapping SCSI over InfiniBand and/or mapping TCP/IP over InfiniBand), and other mapping layers as will occur to those of skill in the art.

The example system management server (152) of FIG. 1 operates generally through its SMS application (182) and its server failover module (184) to effect cascading failover blade servers in a data center according to embodiments of the present invention. The system management server (152) carries out failover operations by transferring a data processing workload (211) from a failing blade server (108) to an initial replacement blade server (114). A data processing workload is a particular task or set of tasks of data processing, a word processor, a spreadsheet, a database process, a data communications task, and so on.

In the example of FIG. 1, the data processing workload (211) is characterized by data processing resource requirements (213). Data processing resources are components of automated computing machinery that carry out data processing, computer processors, random access memory or 'RAM,' non-volatile data storage such as disk drives and the like, input/output adapters, data communications adapters, and so on. The data processing resource requirements (213) are descriptions of the data processing resources that are needed to carry out the data processing of a particular data processing workload, in this example, workload (211).

Also in the example of FIG. 1, the initial replacement blade server (114) has data processing resources (215) that do not match the data processing resource requirements (213). This is not preferred. To the extent that the initial replacement blade server provides fewer resources than are specified as data processing resource requirements for the workload, data processing capacity can be impaired, perhaps even to the point of placing at risk customer quality-of-service or contractual obligations. To the extent that the initial replacement blade server provides more resources than are specified as data processing resource requirements for the workload, efficient utilization of data processing resources in the data center is impaired. It is preferred, therefore, that the data processing resources brought to a workload by any particular blade server match as closely as possible the data processing resource requirements specified for the workload.

The system management server (152) in typical embodiments selects the initial replacement server from a standby pool as having data processing resources that, among other servers in the pool, most closely match the data processing resource requirements. Nevertheless, in this example, the system is left with a mismatch between the data processing resource requirements and the data processing resources of the initial replacement server (114).

The contents of the standby pool (104) are dynamic. Standby servers in the pool are removed from the standby pool when they are assigned as active servers to execute data processing workloads. Active servers that complete the processing of a data processing workload are returned to the standby pool. Failing servers that are repaired are returned to server first by placing in the standby pool and then assigning them as active servers for a workload. And so on. The system management server (152) monitors the availability of resources provided by the standby servers in the standby pool as servers exit and enter the standby pool, comparing available resources to the active workloads.

When, in the process of comparing the data processing resource requirement of the active workloads with the resources provided by servers in the standby pool, the system management server identifies a server in the standby pool having data processing resources (217) that better match the data processing resource requirements (213) than do the data processing resources (215) of the initial replacement blade server, the system management server transfers the data processing workload (211) from the initial replacement blade server to a subsequent replacement blade server (115). That is, in such an embodiment, the subsequent replacement blade server (115) has data processing resources that better match the data processing resource requirements than do the data processing resources of the initial replacement blade server. This is the sense in which the failover is 'cascading,' in that the system management server transfers the workload at least twice, once to an initial replacement blade server having resources that do not match the data processing resource requirements of a workload on a failing server, and at least once more to at least one subsequent replacement blade server that has data processing resources that better match the data processing resource requirements than do the data processing resources of the initial replacement blade server. The system management server carries out a transfer of a workload by capturing and storing the processing state of a failing blade server or an initial replacement blade server, its memory contents, processor register values, pertinent memory addresses, network addresses, and so on, powering down the failing blade server, powering on either an initial replacement blade server or a subsequent replacement blade server, initializing the replacement blade server with the stored processing state of the failing blade server, and continuing execution of the workload on an initial replacement blade server or a subsequent replacement blade server.

For further explanation of failover of blade servers in a data center according to embodiments of the present invention, here is an example of cascading failover using three blade servers labeled A, B, and C:

Server A has 200 TB of resource X
Server B has 500 TB of resource X
Server C has 300 TB of resource X When a resource is described in terms of terabytes ('TB'), readers will recognize that resource as a form of memory, RAM, long-term storage, or the like. In this example, server A provides 200 TB of resource X, which is taken as a data processing resource requirement of a workload running on server A, and, when server A fails, a system management server transfers a data processing workload from server A to server B. Server A is taken down for servicing. Server B is a server from a standby pool, and server B provides 500 TB of resource X, a quantity of resource X that is entirely adequate to meet, indeed, exceeds, the needs of the workload on server A. Server B was selected for the transfer in this example because no other standby servers were available, although the transfer to server B results in an inefficient use of resources because server B provides much more of resource X than is needed by the workload. Server C later comes online in the standby pool, and the system management server then determines that server C with its 300 TB of resource X provides a better match for the data processing resource requirements of the workload than the data processing resources of the initial replacement blade server, server B, which is presently running the workload. The system management server therefore transfers the workload in cascade to server C, returning server B to the standby pool.

For even further explanation of failover of blade servers in a data center according to embodiments of the present invention, here is an example of cascading failover using four blade servers labeled A, B, C, and D:

Server A has 200 TB of resource X
Server B has 500 TB of resource X
Server C has 300 TB of resource X
Server D has 200 TB of resource X Upon failure of server A, a system management server transfers a workload executing on server A to a server from a standby pool, Server B. Server A provides and the workload executing on server A requires 200 TB of resource X. Server B is selected because no other backup servers are available in the standby pool—or because server B provides the currently best match of resources to requirements—despite the fact that server B's resources of 500 TB of resource X substantially exceeds what is actually required. Server B takes up execution of the workload, and server A is taken down for servicing. Server C enters the standby pool and is determined at 300 TB of resource X to provide a more exact resource match for the workload that is now running on server B. The system management server transfers the workload in cascade from server B to server C and returns server B to the standby pool. Similarly, when an even better match from server D becomes available in the standby pool, the system management server transfers the workload in a second cascade to server D and return server C to the standby pool. Server D with its 200 TB of resource X could in fact be server A repaired and returned to availability in the standby pool, or server D could be some other server entirely.

The arrangement of servers and other devices making up the example system illustrated in FIG. 1 are for explanation, not for limitation. Data processing systems useful for cascading failover according to various embodiments of the present invention may include additional servers, routers, other devices, and peer-to-peer architectures, not shown in FIG. 1, as will occur to those of skill in the art.

Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
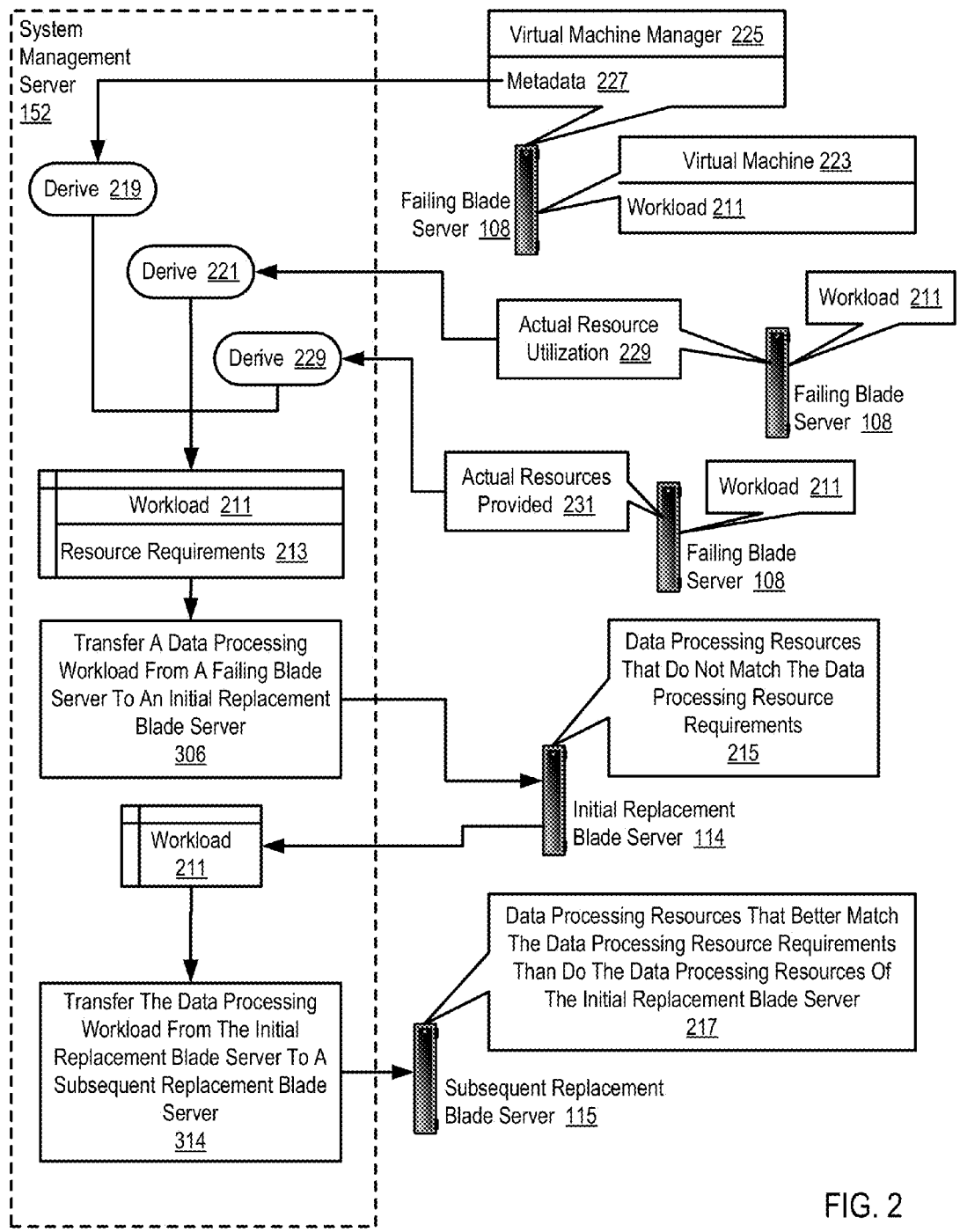
FIG. 2 sets forth a flow chart illustrating an example method of cascading failover of blade servers in a data center.

For further explanation, FIG. 2 sets forth a flow chart illustrating an example method of cascading failover of blade servers in a data center according to embodiments of the present invention. The method of FIG. 2 is implemented on and by equipment in a data center of the kind described and illustrated above with reference to FIG. 1. The method of FIG. 1 includes several alternative example methods of deriving (219, 221) the data processing resource requirements (213) for a workload (211) executing on a failing blade server (108). In one example alternative method of deriving (219) the data processing resource requirements (213) for a workload (211) executing on a failing blade server (108), the data processing workload (211) executes on a virtual machine (223) on the failing blade server (108), and the data processing resource requirements (213) are implemented as virtual machine metadata (227) describing the data processing resource requirements of the virtual machine. In this example, the metadata is maintained by a virtual machine manager, and the process of deriving (219) the data processing resource requirements (213) can be implemented by an application programming interface ('API') call from the system management server's server failover module (184 on FIG. 1) to the virtual machine manager (225).

Virtual machine managers are sometimes referred to as hypervisors, and virtual machine managers that can be adapted for use in cascading failover according to embodiments of the present invention include the IBM hypervisor named PR/SM, Oracle's VM Server for SPARC, Citrix's XenServer, Linux's KVM, Vmware's ESX/ESXi, Microsoft Hyper-V hypervisor, and others as will occur to those of skill in the art. For further explanation, an example of data processing resource requirements (213) implemented as virtual machine metadata (227) describing the data processing resource requirements of virtual machines is set forth here in Table 1:

TABLE 1

Workload Metadata

| Virtual Machine ID | Resource Requirements |
|---|---|
| VM001 | 10 GB RAM |
| VM001 | 1 IBM Power Processor |
| VM001 | 100 TB Disk Storage |
| VM002 | 20 GB RAM |
| VM002 | 3 Intel Pentium Processors |
| VM002 | 200 TB Disk Storage |
| . . . | . . . |

The example of Table 1 implements virtual machine metadata describing data processing resource requirements of two virtual machines, VM001 and VM002, where virtual machine VM001 has resource requirements of 10 GB of RAM, 1 IBM Power Processor, and 100 TB of Disk Storage and virtual machine VM002 has resource requirements of 20 GB of RAM, 3 Intel Pentium Processors, and 200 TB of Disk Storage. This example records resource requirements for only two virtual machines, but readers will recognize that such an implementation could record resource requirements for any number of virtual machines. This example of virtual machine metadata is implemented with a table, but readers will recognize that a variety of data structures can be utilized to implement storage of virtual machine metadata, including, for example, linked lists, arrays, and C-style 'structs.'

In another example alternative method of deriving data processing resource requirements for a workload executing on a failing blade server, the system management server (152) derives (221) the data processing resource requirements (213) based upon actual data processing resource utilization (229) of the data processing workload (211). In such an example, virtualization is optional; the workload (211) can run in a virtual machine or on an operating system installed directly on the hardware of a server. The system management server tracks or monitors and records the facts, for example, that a workload actually uses a particular quantity of RAM, particular computer processors or portions of the run time of particular processors, a particular quantity of disk storage, and so on. Then the system management server characterizes the data processing resource requirements of the data processing workload (211) as the actual resources provided by the physical blade server to which the workload (211) is assigned for execution. For further explanation, an example of data processing resource requirements (213) derived as actual data processing resource utilization is set forth here in Table 2:

TABLE 2

Workload Resource Requirements

| Workload ID | Actual Resource Utilization |
|---|---|
| W001 | 10 GB RAM |
| W001 | 1 IBM Power Processor |
| W001 | 100 TB Disk Storage |
| W002 | 20 GB RAM |
| W002 | 3 Intel Pentium Processors |
| W002 | 200 TB Disk Storage |
| . . . | . . . |

Each record in the example of Table 2 represents data processing resource requirements derived from actual resource utilization of various data processing workloads. Table 2 describes data processing resource requirements of two data processing workloads, W001 and W002, where workload W001 has resource requirements of 10 GB of RAM, 1 IBM Power Processor, and 100 TB of Disk Storage and workload W002 has resource requirements of 20 GB of RAM, 3 Intel Pentium Processors, and 200 TB of Disk Storage. This example Table 2 records resource requirements for only two data processing workloads, but readers will recognize that such an implementation could record resource requirements for any number of data processing workloads. This example of resource utilization taken as data processing resource requirements is implemented with a table, but readers will recognize that a variety of data structures can be utilized to implement storage of actual resource utilization, including, for example, linked lists, arrays, and C-style 'structs.'

In a further example alternative method of deriving data processing resource requirements for a workload executing on a failing blade server, the system management server (152) derives (229) the data processing resource requirements (213) based upon actual data processing resources (231) provided by blade servers (108) upon which one or more data processing workloads (211) execute. In such an example, again, virtualization is optional; the workload (211) can run in a virtual machine or on an operating system installed directly on the hardware of a server. Either way, it is the actual data processing resources (231) provided by the physical server itself (108) that is taken by the system management server as the data processing resource requirements (213) for the data processing workload (211). The system management server tracks or monitors and records the facts, for example, that blade servers upon which workloads execute actually provide particular quantities of RAM, particular computer processors, particular quantities of disk storage, and so on. Then the system management server characterizes the data processing resource requirements of data processing workloads (211) as the actual resource utilization of the physical blade servers to which the workloads (211) are assigned for execution.

Such utilization of actual resources as resource requirements can be implemented with a table similar to Table 2, with the exception that the right column would set forth, rather than resource utilization, descriptions of actual resources provided by blade servers upon which corresponding workloads were installed.

The method of FIG. 2 includes also transferring (306) by the system management server (152) a data processing workload (211) from a failing blade server (108) to an initial replacement blade server (114), where the data processing workload (211) is characterized by data processing resource requirements (213), and the initial replacement blade server (114) has data processing resources (215) that do not match the data processing resource requirements (213). The method of FIG. 2 also includes transferring (314) by the system management server (152) the data processing workload (211) from the initial replacement blade server (114) to a subsequent replacement blade server (115), where the subsequent replacement blade server has data processing resources (217) that better match the data processing resource requirements (213) than do the data processing resources (215) of the initial replacement blade server (114). The transfer to the subsequent replacement blade server is characterized as a cascading transfer.

Figure 3:
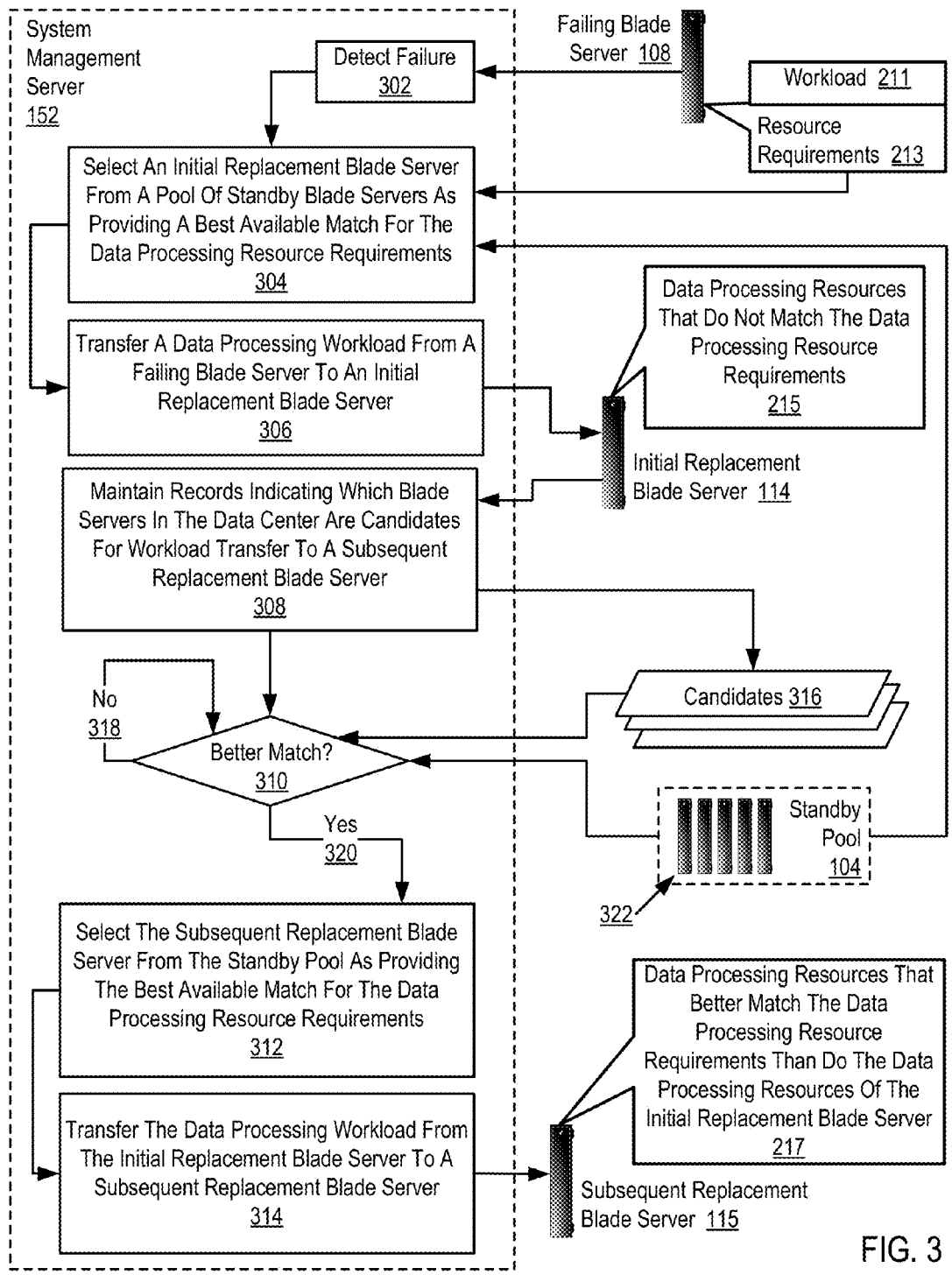
FIG. 3 sets forth a flow chart illustrating a further example method of cascading failover of blade servers in a data center.

For further explanation, FIG. 3 sets forth a flow chart illustrating a further example method of cascading failover of blade servers in a data center. The method of FIG. 3, like the method of FIG. 2, also is implemented on and by equipment in a data center of the kind described and illustrated above with reference to FIG. 1. The method of FIG. 3 includes detecting (302) a failing blade server, where the failing blade server is executing a data processing workload (211) characterized by data processing resource requirements (213). The system management server (152) detects such failures through exceptions and interrupts thrown by failing processes within the workload itself, system-level interrupts caused by memory failures or other hardware problems on the failing blade server, and so on, as will occur to those of skill in the art.

The method of FIG. 3 also includes selecting (304) an initial replacement blade server (114) from a pool (104) of standby blade servers (322), where the initial replacement blade server is selected as providing, as among the standby blade servers, the best available match between the data processing resource requirements (213) and the data processing resources (215) of the initial replacement blade server. In the trivial case of only one blade server in the standby pool, then the best available match is the only available match. In the best available match at this stage of a cascading failover, the initial replacement blade server (114), despite providing the best match currently available, still has data processing resources (215) that do not match the data processing resource requirements (213).

The method of FIG. 3 also includes also transferring (306) by the system management server (152) the data processing workload (211) from the failing blade server (108) to the initial replacement blade server (114). The system management server transfers the workload by capturing and storing the processing state of the failing blade server, its memory contents, processor register values, pertinent memory and network addresses, and so on, powering down the failing blade server, powering on the initial replacement blade server, initializing the replacement blade server with the stored processing state of the failing blade server, and continuing execution of the workload on the initial replacement blade server.

The method of FIG. 3 also includes maintaining (308) by the system management server records (316) indicating which blade servers in the data center are candidates for workload transfer to a subsequent replacement blade server. In this context, a candidate is a blade server whose data processing resources do not match the data processing resource requirements of a data processing workload executing on that blade server. The system management server can, for example, maintain records indicating which blade servers in the data center are candidates for workload transfer to a subsequent replacement blade server by use of a data structure such as the one illustrated by Table 3:

TABLE 3

Active Blade Server Status

| Svr ID | Server Resources | Workload ID | Workload Resource Requirements | Candidate |
|---|---|---|---|---|
| S001 | 10 GB RAM, 1 Power Processor, 100 TB Disk Storage | W001 | 10 GB RAM, 1 Power Processor, 100 TB Disk Storage | No |
| S002 | 10 GB RAM, 1 Power Processor, 100 TB Disk Storage | W002 | 10 GB RAM, 1 Power Processor, 100 TB Disk Storage | No |
| S003 | 50 GB RAM, 5 Intel Processors, 500 TB Disk Storage | W003 | 20 GB RAM, 3 Intel Processors, 200 TB Disk Storage | Yes |
| S004 | 100 GB RAM, 8 Intel Processors, 600 TB Disk Storage | W004 | 20 GB RAM, 3 Intel Processors, 200 TB Disk Storage | Yes |
| ... | ... | ... | ... | ... |

Each record in Table 3 represents an active server executing a data processing workload. Each active server is identified by a value in the "Svr ID" column. Each active server's data processing resources are described in the column labeled "Server Resources." The workload assigned to each active server is identified by a value in the "Workload ID" column. The data processing resource requirements for each workload are listed in the "Workload Resource Requirements" column. And the "Candidate" column sets forth a Boolean indication, "Yes" or "No," whether each server's data processing resources are a good match for the data processing resource requirements of the workload assigned to that server. In this particular example, the resources provided by active servers S001 and S002 do match the data processing resource requirements of the corresponding workloads W001 and W002, and the corresponding "Candidate" values, "No," indicate that servers S001 and S002 are not candidates for workload transfer to a subsequent replacement blade server. Also in this particular example, the resources provided by active servers S003 and S004 far exceed and therefore do not match the data processing resource requirements of the corresponding workloads W003 and W004, and the corresponding "Candidate" values, "Yes," indicate that servers S003 and S004 are good candidates for workload transfer to a subsequent replacement blade server.

The method of FIG. 3 also includes monitoring (310) by the system management server (152) a pool (104) of standby blade servers (322) for availability of replacement blade servers that better match the data processing resource requirements of a data processing workload (211) executing on a candidate (316) than do the data processing resources of the candidate. As mentioned, the term 'candidate' refers to blade servers whose data processing resources do not match the data processing resource requirements of data processing workloads executing on those blade servers. In the method of FIG. 3, if no candidate is found, the system management server continues to monitor (318) the standby pool until one or more candidates are found. When one or more candidates are found (320), the system management server proceeds by selecting (312) one or more subsequent replacement blade servers from the standby pool. Table 4 illustrates an example of a data structure that can be used to monitor a pool of standby blade servers for better matches of resources to resource requirements, that is, better matches than were provided by initial replacement servers:

TABLE 4

Available Standby Blade Servers

| Server ID | Data Processing Resources |
|---|---|
| S010 | 10 GB RAM, 1 Power Processor, 100 TB Disk Storage |
| S011 | 10 GB RAM, 1 Power Processor, 100 TB Disk Storage |
| S013 | 20 GB RAM, 3 Intel Processors, 200 TB Disk Storage |
| S014 | 100 GB RAM, 8 Intel Processors, 600 TB Disk Storage |
| ... | ... |

Each record in Table 4 represents an available standby blade server (322) in a standby pool (104). Each record identifies an available standby server with a "Server ID" and provides for each server a description of the "Data Processing Resources" provided by that server. The system management server can monitor the pool of standby servers for availability of better matches, for example, by comparing the "Data Processing Resources" descriptions in Table 1 with the contents of the "Workload Resource Requirements" column in Table 3. In this example, the data processing resources provided by standby servers S010, S011, and S014 provide no better matches than the initial replacement servers already assigned to any of the workloads W001, W002, W003, and W004 according to Table 3. Server S013, however, does provide a better match for some of the workloads described in Table 3.

The method of FIG. 3 also includes selecting (312) the subsequent replacement blade server (115) from a pool (104) of standby blade servers (322). Such a subsequent replacement blade server (115) provides, as among the standby blade servers (322), the best available match between the data processing resource requirements (213) and the data processing resources (217) of the subsequent replacement blade server. Continuing with the explanatory example comparison of the resources and resource requirements illustrated by Tables 3 and 4, note that standby server S013 does in fact provide a best available match of resources to resource requirements, even in comparison with either server S003 or S004 currently assigned according to Table 3 respectively to workloads W003 and W004. Servers S003 and S004 therefore are both good candidates for a transfer of either of their workloads W003 and W004 in a cascading failover to server S013 with its exact match of 20 GB of RAM, 3 Intel Processors, and 200 TB of disk storage. Selecting the subsequent replacement server therefore in this example can be carried out by selecting server S013 as the subsequent replacement blade server for either of the active servers S003 or S004.

Having selected a subsequent replacement blade server, the method of FIG. 3 also includes transferring (314) by the system management server (152) the data processing workload (211) from the initial replacement blade server (114) to the subsequent replacement blade server (115), because, as discussed, the subsequent replacement blade server has data processing resources (217) that better match the data processing resource requirements (213) than do the data processing resources (215) of the initial replacement blade server (114).

The transfer to the subsequent replacement blade server is characterized as a cascading transfer.

Example embodiments of the present invention are described largely in the context of a fully functional computer system for cascading failover of blade servers in a data center. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the example embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A system management server for a data center, the system management server comprising a computer processor and a computer memory operatively coupled to the computer processor, the computer memory having disposed within the computer memory computer program instructions that when executed by the processor cause the system management server to implement cascading failover of blade servers in the data center by:
   transferring by the system management server a data processing workload from a failing blade server to an initial replacement blade server, the data processing workload characterized by data processing resource requirements, the initial replacement blade server having data processing resources that do not match the data processing resource requirements; and
   transferring by the system management server the data processing workload from the initial replacement blade server to a subsequent replacement blade server, the subsequent replacement blade server having data processing resources that better match the data processing resource requirements than do the data processing resources of the initial replacement blade server.

2. The system management server of claim 1 further comprising computer program instructions that cause the system management server to maintain records indicating which blade servers in the data center are candidates for workload transfer to a subsequent replacement blade server, a candidate being a blade server whose data processing resources do not match the data processing resource requirements of a data processing workload executing on that blade server.

3. The system management server of claim 1 further comprising computer program instructions that cause the system management server to monitor a pool of standby blade servers for availability of replacement blade servers that better match the data processing resource requirements of a data processing workload executing on a candidate than do the data processing resources of the candidate.

4. The system management server of claim 1 further comprising computer program instructions that cause the system management server to select the subsequent replacement blade server from a pool of standby blade servers, the subsequent replacement blade server providing, as among the standby blade servers, the best available match between the data processing resource requirements and the data processing resources of the subsequent replacement blade server.

5. The system management server of claim 1 wherein:
the data processing workload is executed on a virtual machine on the failing blade server; and
the data processing resource requirements are implemented as virtual machine metadata describing the data processing resource requirements of the virtual machine.

6. The system management server of claim 1 further comprising computer program instructions that cause the system management server to derive the data processing resource requirements based upon actual data processing resource utilization of the data processing workload.

7. The system management server of claim 1 further comprising computer program instructions that cause the system management server to derive the data processing resource requirements based upon actual data processing resources provided by blade servers upon which one or more data processing workloads execute.

8. A computer program product for cascading failover of blade servers in a data center, the computer program product disposed upon a non-transitory computer readable medium, the computer program product comprising computer program instructions when executed by a computer processor cause a system management server of the data center to implement cascading failover of blade servers in the data center by:
transferring by the system management server a data processing workload from a failing blade server to an initial replacement blade server, the data processing workload characterized by data processing resource requirements, the initial replacement blade server having data processing resources that do not match the data processing resource requirements; and
transferring by the system management server the data processing workload from the initial replacement blade server to a subsequent replacement blade server, the subsequent replacement blade server having data processing resources that better match the data processing resource requirements than do the data processing resources of the initial replacement blade server.

9. The computer program product of claim 8 further comprising computer program instructions that cause the system management server to maintain records indicating which blade servers in the data center are candidates for workload transfer to a subsequent replacement blade server, a candidate being a blade server whose data processing resources do not match the data processing resource requirements of a data processing workload executing on that blade server.

10. The computer program product of claim 8 further comprising computer program instructions that cause the system management server to monitor a pool of standby blade servers for availability of replacement blade servers that better match the data processing resource requirements of a data processing workload executing on a candidate than do the data processing resources of the candidate.

11. The computer program product of claim 8 further comprising computer program instructions that cause the system management server to select the subsequent replacement blade server from a pool of standby blade servers, the subsequent replacement blade server providing, as among the standby blade servers, the best available match between the data processing resource requirements and the data processing resources of the subsequent replacement blade server.

12. The computer program product of claim 8 wherein:
the data processing workload is executed on a virtual machine on the failing blade server; and
the data processing resource requirements are implemented as virtual machine metadata describing the data processing resource requirements of the virtual machine.

13. The computer program product of claim 8 further comprising computer program instructions that cause the system management server to derive the data processing resource requirements based upon actual data processing resource utilization of the data processing workload.

* * * * *